Nov. 26, 1957 L. L. PFLUGER ET AL 2,814,170
WORK ALINING ATTACHMENT ON GRINDING MACHINE
Filed Aug. 25, 1954 3 Sheets-Sheet 1
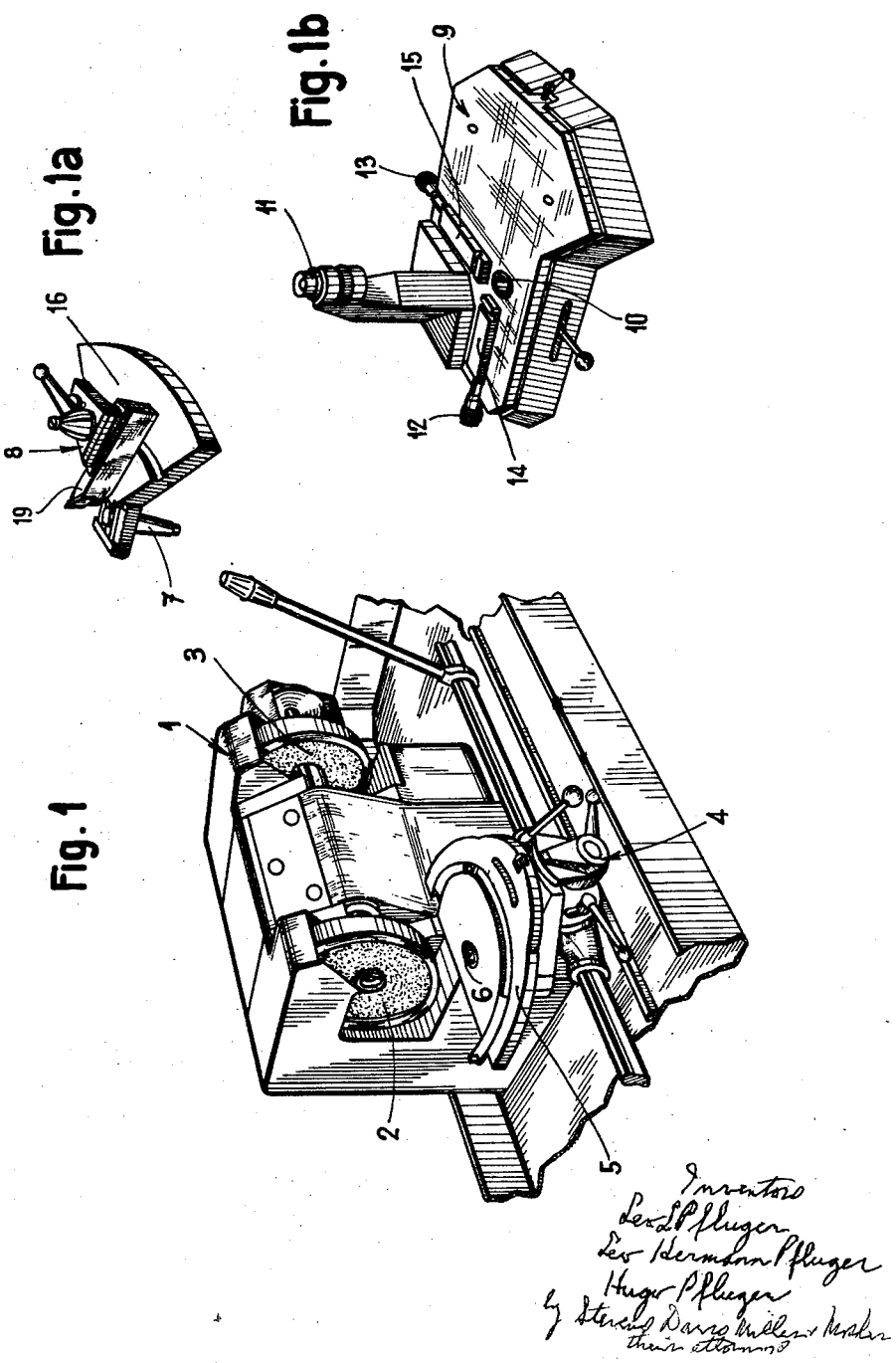

Nov. 26, 1957  L. L. PFLUGER ET AL  2,814,170
WORK ALINING ATTACHMENT ON GRINDING MACHINE
Filed Aug. 25, 1954  3 Sheets-Sheet 2
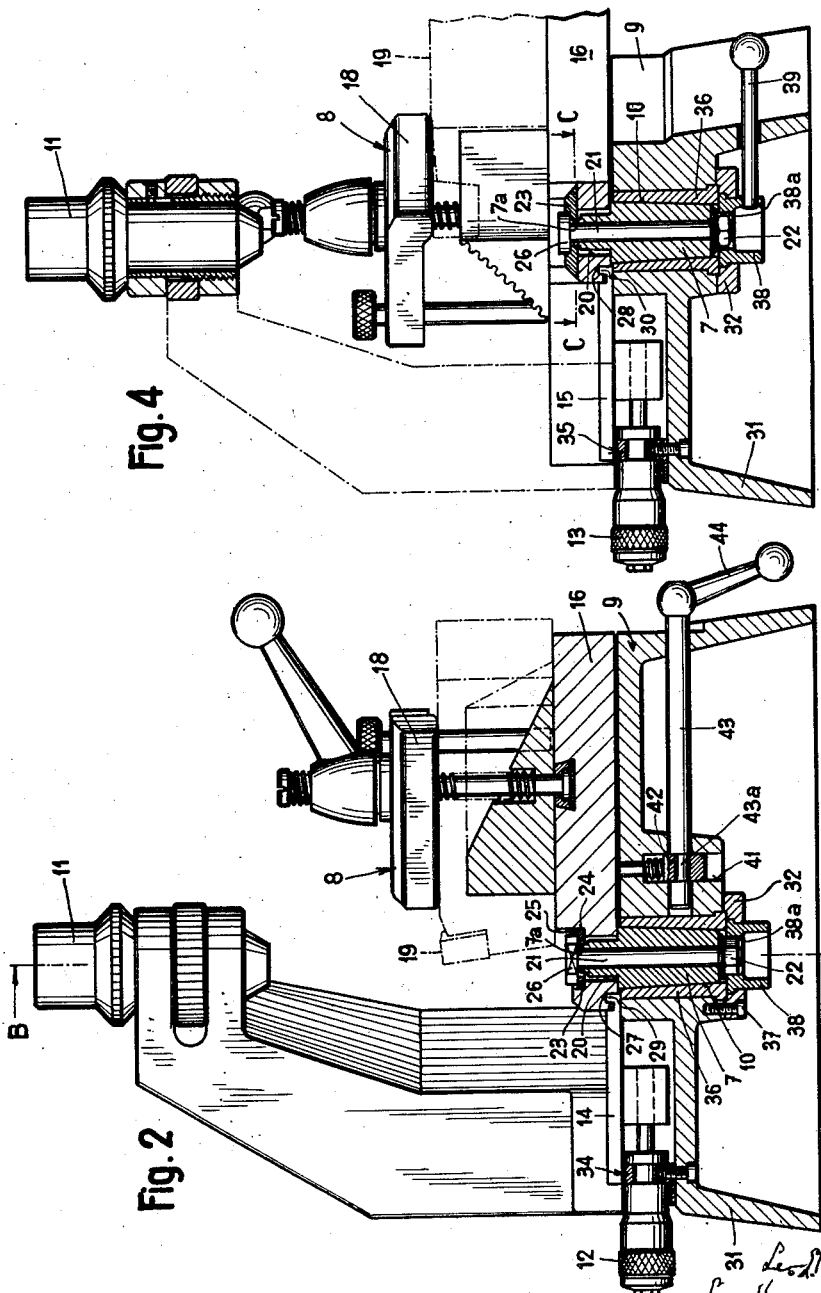

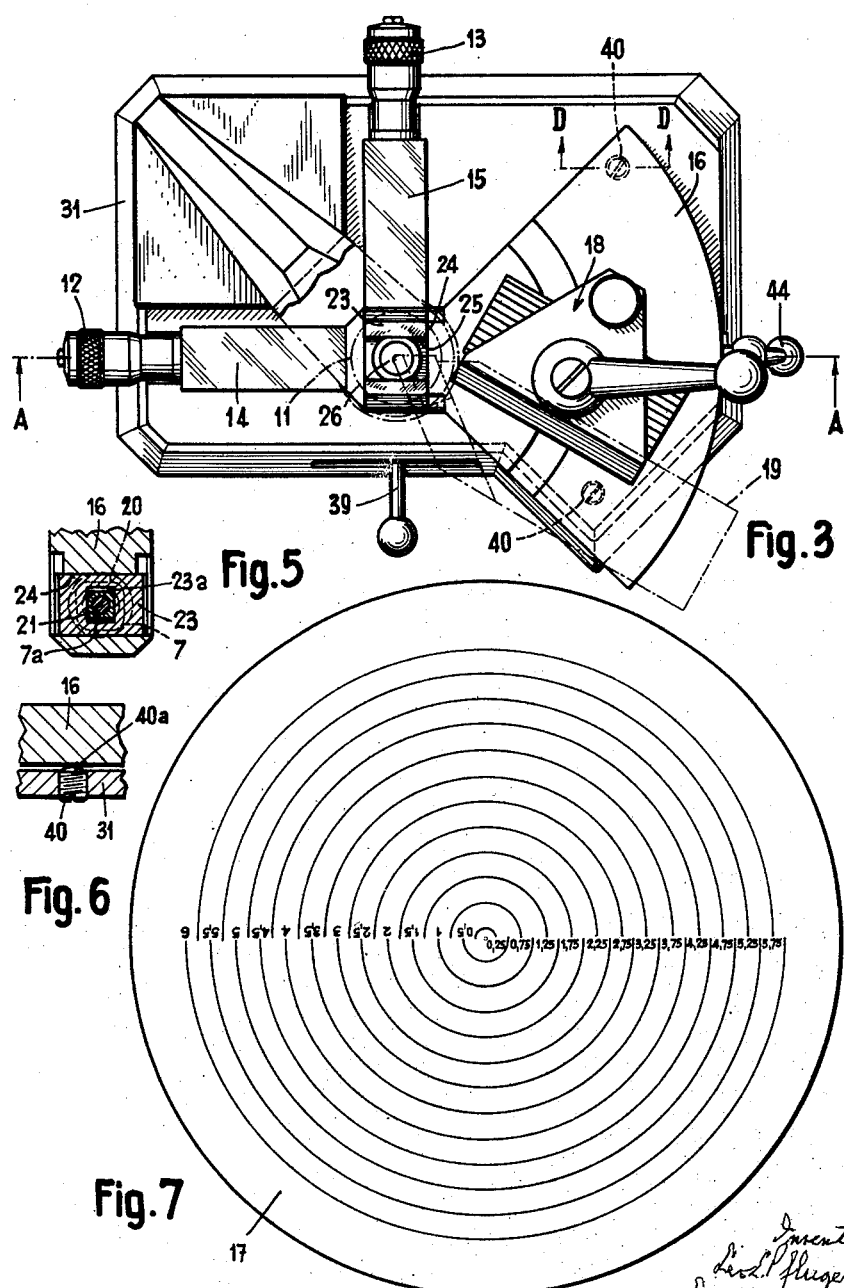

United States Patent Office 2,814,170
Patented Nov. 26, 1957

2,814,170

WORK ALINING ATTACHMENT ON GRINDING MACHINE

Leo L. Pfluger, Leo Hermann Pfluger, and Hugo Pfluger, Solothurn, Switzerland, assignors to Agathon A. G., Solothurn, Switzerland Application August 25, 1954, Serial No. 452,038

Claims priority, application Switzerland September 1, 1953

1 Claim. (Cl. 51—234)

The present invention relates to a grinding-machine attachment for alining a workpiece, in particular a turning tool, for the purpose of grinding a round area thereon, in which, when clamping the workpiece to a pivoted holder, the workpiece with the center of its round area to be ground is alined with the pivotal axis of the holder by means of an optically magnifying ranging device.

In such known method of alining the work, the tip of the turning tool is so alined with the pivotal axis of the workpiece holder that a minimum of material has to be ground off, in view of the fact that these tools often are very costly. According to older proposals, the rough-ground tip is set up against a jig. In more recent proposals, an optically magnifying device is used for such purpose. Such device so far, however, has always been disposed on the machine itself, with the result that it became dirty relatively quickly by swarf and thus had to be often cleaned. Since the swarf comprises grain particles of great hardness, there was always the risk of scratching the optical glasses when cleaning same.

Such scratching is obviated in accordance with the present invention in that the alinement is carried out on an alining table which is separated from the machine and into which the workholder is insertable.

The work alining attachment according to the present invention comprises an alining table which carries an optical ranging device and is provided with a bore in coaxial arrangement with the collimation axis. The attachment further comprises a workholder which is provided with a pivoted pin which is adjustable and lockable in two directions extending at right angles to each other. The workholder inserted into the alining table is adjustable, by means of two micrometer screws disposed on the table, in a plane standing at right angles to the collimation axis.

One form of the present invention is shown, by way of example, in the accompanying drawings, in which:

Fig. 1 is a perspective view of a grinding machine known per se, Fig. 1b is a perspective view of the alining table separated from the latter, and Fig. 1a is a perspective view of the workholder which is alternately mountable on the machine and on the alining table, Fig. 2 is an elevation of the alining table in section on the line A—A of Fig. 3, Fig. 3 is a top plan view of the alining table, Fig. 4 is a side view of the alining table in section on the line B—B of Fig. 2, Fig. 5 shows a detail in section on the line C—C of Fig. 4.

Fig. 6 illustrates a further detail in section on the line D—D of Fig. 3, and

Fig. 7 shows the ruled grating of the optical ranging device of the alining table on a larger scale.

On the left-hand side of Fig. 1 is shown a super-finishing grinding and lapping machine known per se. The numerals 2 and 3 designate two diamond grinding-wheels and 4 is a carriage supporting a sector-shaped superstructure 5 in the center of which is provided a conical bore 6 for accommodating a corresponding conical swivel pin 7 which forms part of a workholder 8 for the turning tool 19 to be ground.

On the right-hand side of Fig. 1 is shown (see Fig. 1b) an alining table 9 which also is provided with a bore 10 for accommodating the swivel pin 7, said bore being coaxial with an optically magnifying ranging device 11. The turning tool 19 to be ground is so clamped down to the workholder 8 mounted on the alining table 9 that its tip which already has been cylindrically ground in the rough or which is worn, is approximately alined with its center onto the common axis of the ranging device 11 and of bore 10. For such purpose the ranging device 11 comprises the ruled grating 17 shown in Fig. 7, which is known per se.

The chucking plate 16 of workholder 8 (see Fig. 1a) then is moved, by means of adjustable slides 14, 15 and micrometer screws 12 and 13, relatively to the bearing pin 7 which is seated in bore 10, until alinement is complete. Swivel pin 7 is clamped down to chucking plate 16. The workholder 8 together with the turning tool then is removed from the alining table 9, and its pin 7 is inserted in bore 6 of superstructure 5 of machine 1. After this stage has been reached, the tool 19 is ground and lapped by swivelling pin 7 back and forth in bore 6.

Details of machine 1 not mentioned already do not form part of the present invention and, thus, will not be described.

The constructional details of workholder 8 and alining table 9 will now be described with reference to Figs. 2 to 6.

Holder 8 comprises, besides the chucking plate 16, known means 18 for clamping the turning tool 19. Plate 16 is of sector-shape, and at its center is provided a bore 20 through which passes a screw 21 which, together with a nut 22 and a washer 23, serves for clamping pin 7 to plate 16. The washer 23 is rectangular in plan and is seated in a rectangular seat 24 formed in the top face of the plate 16. The washer has its central opening receiving the upper end of the pin 7 through which the screw 21 passes. The head 26 of the screw is fitted in a rectangular counterbore 25 in the upper face of the washer so that the head cannot rotate and the screw is thus held from rotation. The pivot 7, together with clamping screw 21 fitted therein, is movable in a plane standing at right angles to its longitudinal axis and in two directions which extend at right angles to each other. Clamping screw 21, however, is fixed against rotation with respect to clamping plate 16, such feature being of importance when tightening nut 22. In order to prevent nut 22 from slackening when rotating pin 7 in bore 6, said pin is secured against rotation relatively to plate 16 in that its topmost portion 7a is of rectangular cross-section and is engaged in a rectangular recess 23a of washer 23.

Plate 16 on its underside is provided with two grooves 27 and 28 which are parallel to the grooves 24 and 25 respectively and in which are engaged claws 29 and 30 of the slides 14 and 15, the latter being movably guided on housing 31 of the alining table and at right angles to the respective claws. Such engagement takes place when workholder 8 is being mounted on table 9. The slides 14, 15 are movable by means of the micrometer screws 12, 13 which turn in bearings 34, 35 secured to housing 31 but cannot move therein. With the aid of the means described above, plate 16 is movable with respect to pin 7 in two directions extending at right angles to each other, pin 7 being seated in bore 10 which is formed in a sleeve 36 fixedly secured to housing 31. A key sleeve 38 is rotatably but non-displaceably mounted between sleeve 36 and a ring 32 which is secured to housing 31 by means of screws 37. Sleeve 38 is provided with a hexagonal recess 38a into which fits the nut 22, and is actuable by means of an arm 39 secured thereto, the latter passing through a sidewall of housing 31. Pin 7 thus may be very conveniently clamped to plate 16 or be detached therefrom whilst the plate is coupled to the micrometer screws 12, 13.

Pin 7 and bores 6, 10 all have the same slight taper. When holder 8 is mounted on table 9, it bears in conical bore 10 only by pin 7 and, at some distance therefrom, on the visible spherical head surfaces 40a of two carrier studs 40 which are adjustable in threaded bores of housing 31. Thus there is a gap between housing 31 and plate 16, which gap permits adjustment of the contact between the head faces 40a and the underside of plate 16.

For the purpose of facilitating the removal of holder 8 from table 9, a stepped bore 41 is provided in housing 31, and in said bore is movable a ram 42 by means of an eccentric formed on a shaft 43 when the latter is turned by means of a handle 44.

In use, when the turning tool is to be ground, it is clamped to the workholder, which is mounted on the table 9, so that the tip of the tool is substantially alined with its center lying on the common axis of the ranging device 11 and of the bore 10. The chucking plate 16 of the workholder is then moved by means of the slides 14 and 15 and the micrometer screws 12 and 13 relative to the swivel pin 7 until alinement is complete. The swivel pin is then clamped down to the chucking plate 16. The workholder 8 is then removed from the table 9 and is mounted on the superstructure 5 of the carriage by inserting the pin 7 into the bore 6. The workholder is then rotated back and forth with its pin 7 bearing in the bore 6 so as to bring the tip of the tool into contact with the grinding wheels, the tool 19 being thusly ground and lapped.

What we claim is:

In combination, an aligning table including an optical ranging device and having a bore arranged coaxial with the collimation axis of the optical ranging device, a workholder having a swivel pin adapted to be engaged in the vertical bore of the carriage type support of a machine tool, means for relatively adjusting the workholder and swivel pin relative to each other in two directions extending at right angles to each other for aligning an element of a workpiece with said collimation axis and said swivel pin being dimensioned to complement the dimensions of both of the bores so that after a workpiece on the holder has been properly aligned on the aligning table for machining a portion thereof, the workholder may be rotatably mounted on the carriage type support by inserting the pin in the bore thereof and whereby the workpiece may be oscillated to move said portion thereof in engagement with a working element on the machine.

References Cited in the file of this patent

UNITED STATES PATENTS

| | | |
|---|---|---|
| 918,770 | Sachs | Apr. 20, 1909 |
| 1,761,260 | Gallasch | June 3, 1930 |
| 2,399,052 | McCain | Apr. 23, 1946 |
| 2,443,325 | Post | June 15, 1948 |
| 2,497,070 | Coleman | Feb. 14, 1950 |

FOREIGN PATENTS

| | | |
|---|---|---|
| 135,810 | Switzerland | Dec. 16, 1929 |
| 243,885 | Switzerland | Aug. 15, 1946 |